Patented Aug. 21, 1951

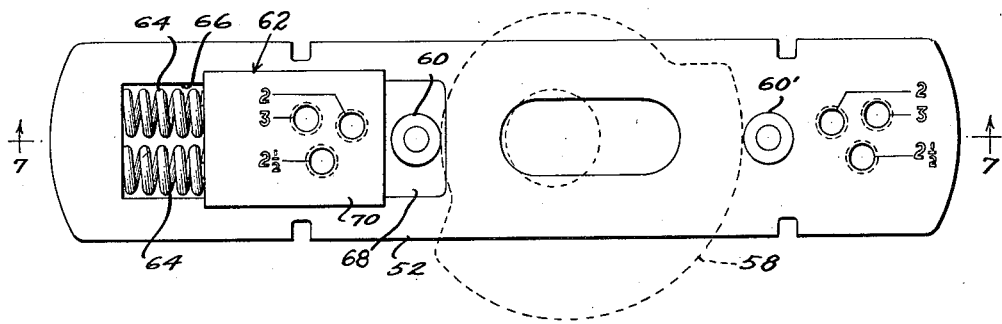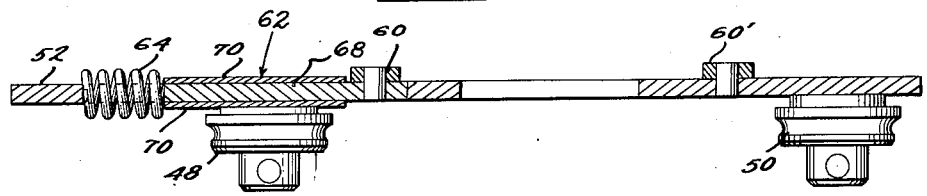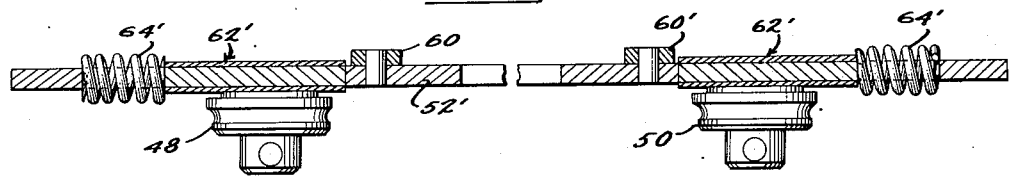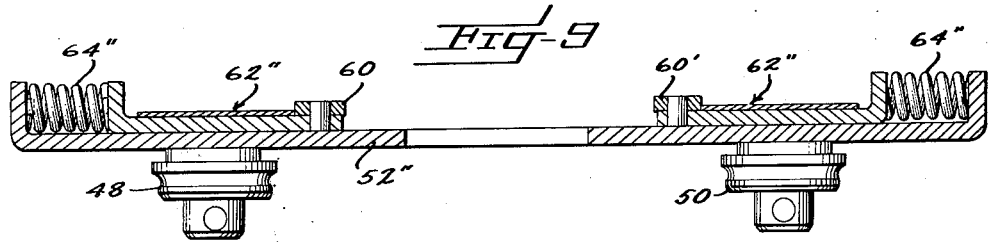

2,564,724

UNITED STATES PATENT OFFICE 2,564,724

CAN-SEAMING MECHANISM

Oliver R. Rowe, Charles S. W. King, and William J. Stolp, Charlotte, N. C., assignors to R. H. Bouligny, Inc., a corporation of North Carolina Application February 5, 1949, Serial No. 74,762

9 Claims. (Cl. 113—23)

This invention relates to can seaming mechanisms, particularly can seaming mechanisms of the type adapted for home canning operations in which a lid is sealed on a can body by seaming, and constitutes an improvement of the can seaming mechanism disclosed in our copending application, Serial No. 35,918, filed June 29, 1948, now Patent No. 2,511,738, June 13, 1950.

In our above noted copending application, a can seaming mechanism is disclosed in which the seaming rolls are mounted uniquely on a reciprocating crosshead for application to the lid and can body to be seamed in a manner such that the force of application of the seaming rolls is balanced with respect to the chuck means provided for supporting the lid and can body for seaming.

According to the present invention, an improved arrangement is provided for mounting the seaming rolls, and the related means through which the force of application of the rolls is exerted on the reciprocating crosshead so that the seaming rolls and related applying means are relatively yieldably positioned and loaded whereby a force of application for the seaming rolls may be obtained at a predetermined desired level during the seaming operation, and whereby the can seaming mechanism may be fully set for the desired force of application at the time of assembly and thus supplied ready for use without requiring any adjustment either when placed in use or subsequently during continued operation.

Heretofore, the can seaming mechanisms commercially available have commonly been supplied with a set of gauging wires which could be used as feelers for adjusting the seaming rolls at a proper setting. It has been usual to set the seaming rolls in this manner each time the can seaming mechanism was made ready for use, and it was essential that the rolls be set each time a change for a different can size was made. This continual necessity for adjustment of the seaming rolls is not only troublesome, but also requires more skill to obtain fully satisfactory results than the ordinary person who might operate such a can sealing mechanism is likely to have.

These disadvantages are entirely eliminated by the present invention which makes it possible to build a proper setting for the seaming rolls directly into the can seaming mechanism in a manner such that automatic compensation is provided for any dimensional variations normally occuring during manufacture, or resulting from continued use and operation, of the can seaming mechanism.

The present invention is disclosed in further detail below in connection with the accompanying drawing in which:

Fig. 6 is a plan detail of the reciprocating crosshead, with the actuating cam indicated in dotted lines;

Fig. 7 is a sectional detail taken substantially on the line 7—7 in Fig. 6; and

Figs. 8 and 9 are similar sectional details of modified arrangements according to the present invention of the reciprocating crosshead shown in Figs. 6 and 7.

Figure 1:
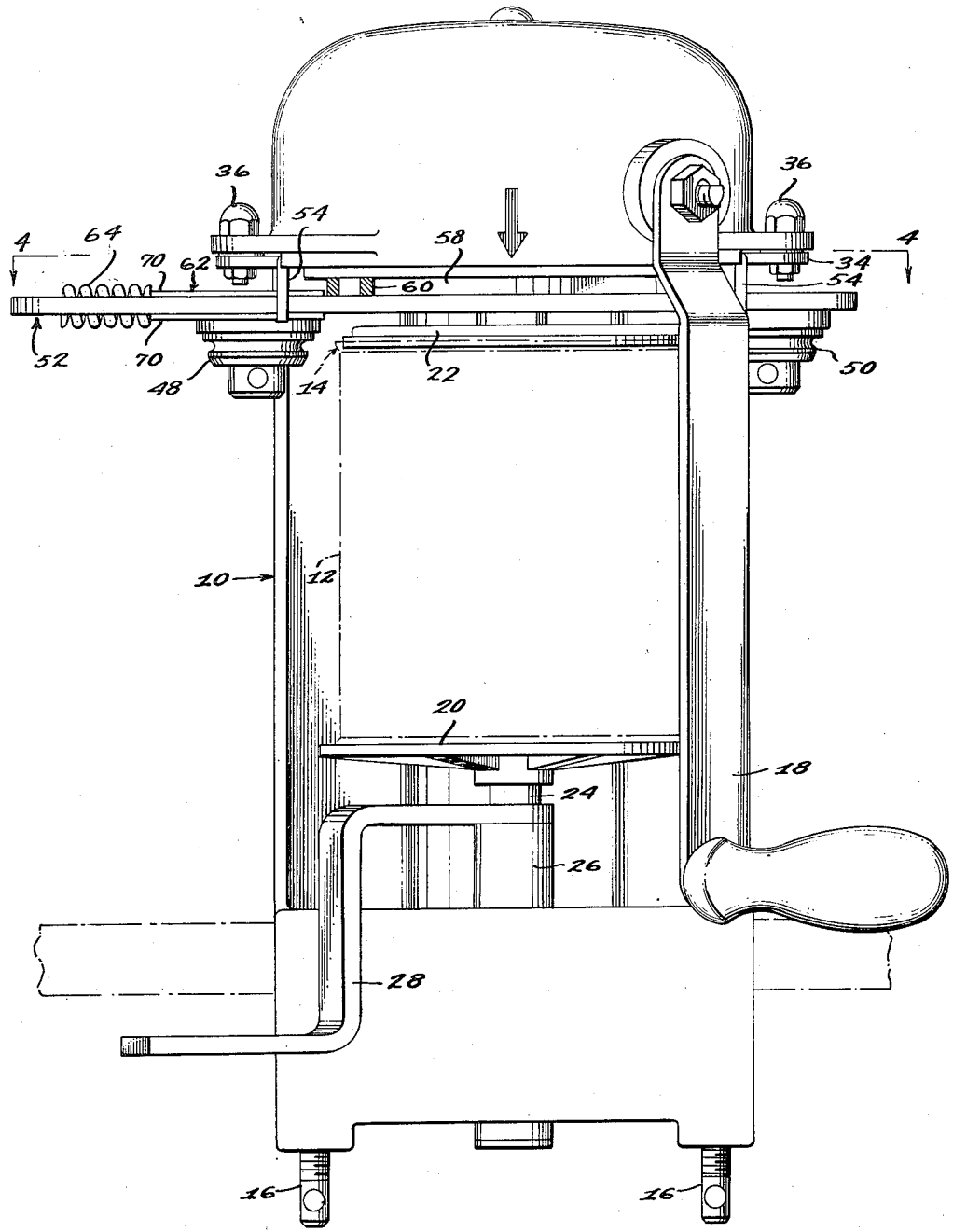
Fig. 1 is a front elevation of a can seaming mechanism embodying the present invention.
Figure 2:
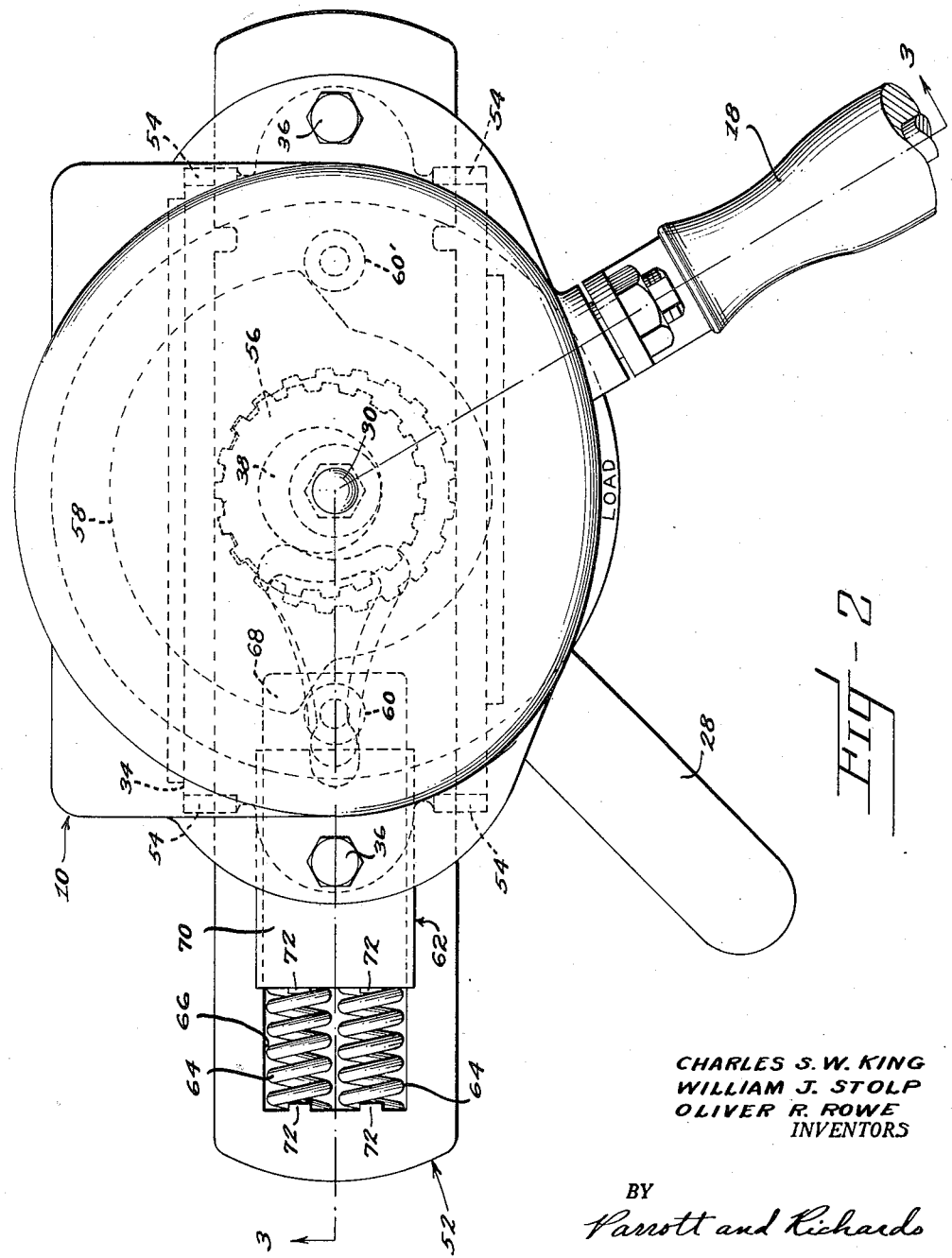
Fig. 2 is a plan view of the can seaming mechanism shown in Fig. 1.

Referring first to Fig. 1 of the drawing, the can seaming mechanism shown incorporates generally the construction disclosed in our above noted copending application, which construction comprises a frame structure 10 adapted for supporting a can body 12 and an associated lid 14 for seaming. The frame structure 10 is fitted at its lower portion with screw clamps 16 for mounting on the edge of a table or the like as indicated in the drawing (compare Figs. 1 and 3), and the head portion of the frame structure 10 carries a suitable hank crank 18 by which the seaming operation is actuated as will be described more in detail presently.

The can body 12 and associated lid 14 are supported on the frame structure 10 by chuck means comprising a rotatable supporting table 20 and a driving chuck 22. The supporting table 20 is carried on a spindle 24 (as shown best in Fig. 3), which is received in a tubular sleeve 26 arranged in the lower portion of the frame structure 10 for manipulation by a lever arm 28 so that the supporting table 20 may be elevated for clamping a can body 12 and associated lid 14 against the driving chuck 22 or lowered for inserting and removing a can body and lid as desired.

Figure 3:
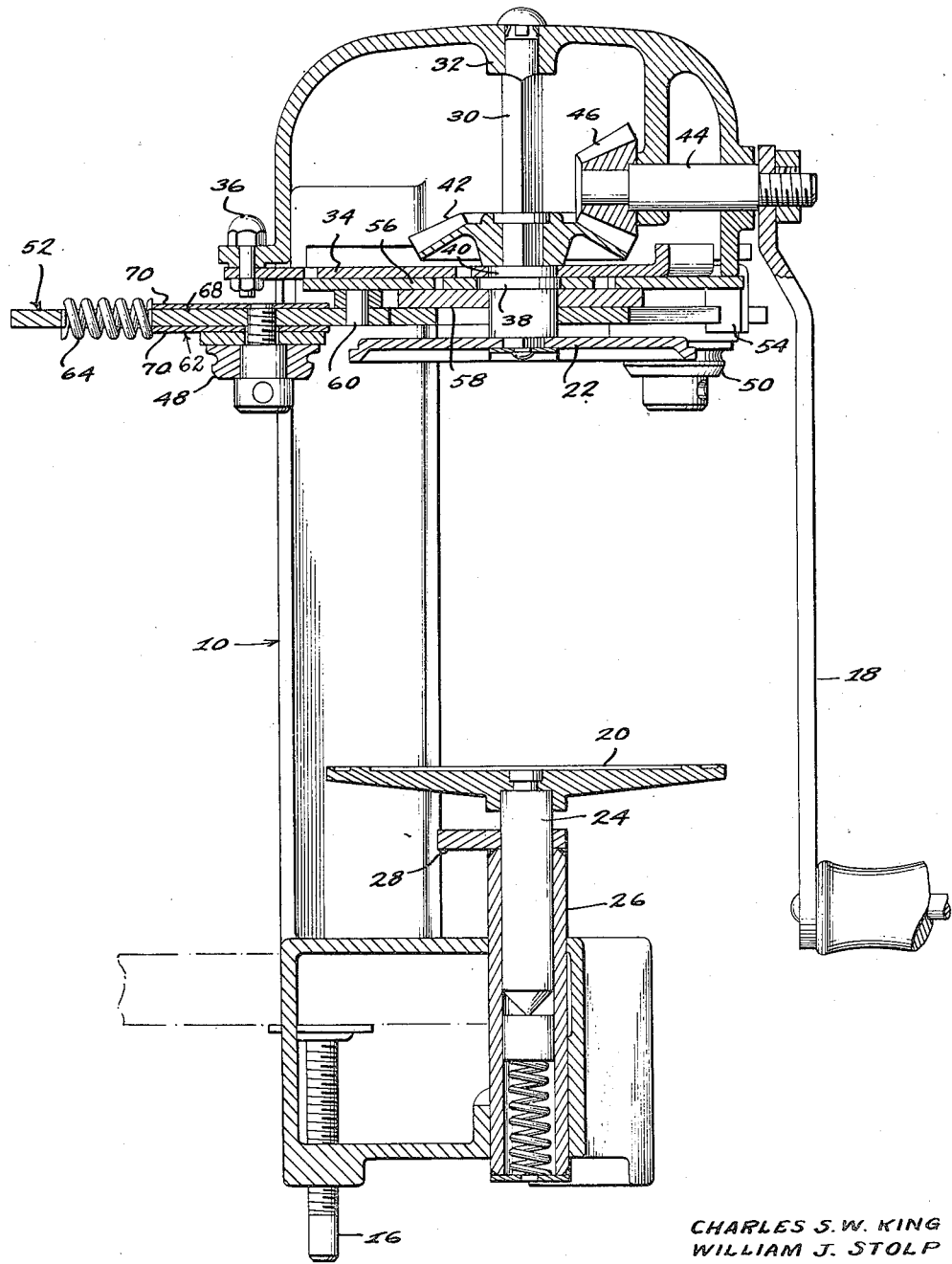
Fig. 3 is a vertical section taken substantially on the line 3—3 in Fig. 2.
Figure 4:
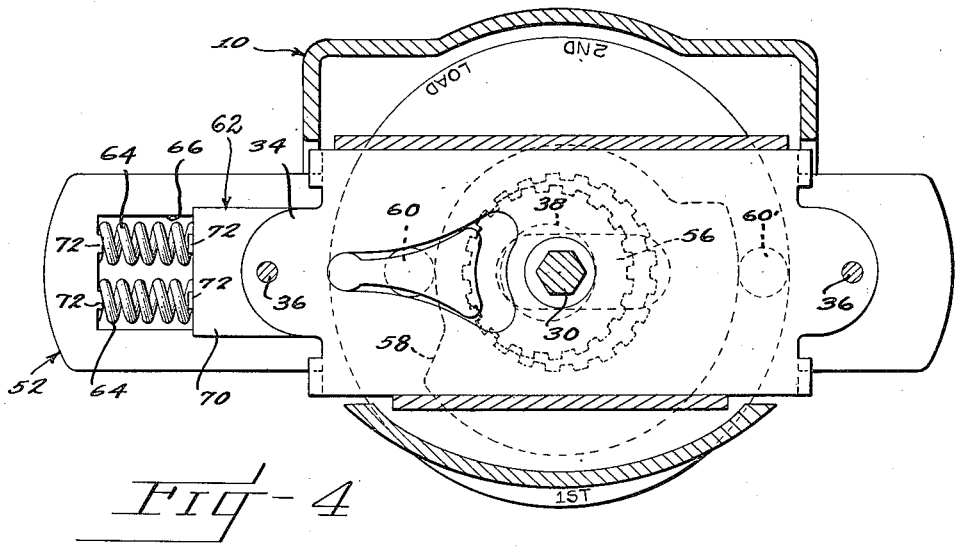
Fig. 4 is a horizontal section taken substantially on the line 4—4 in Fig. 1.
Figure 5:
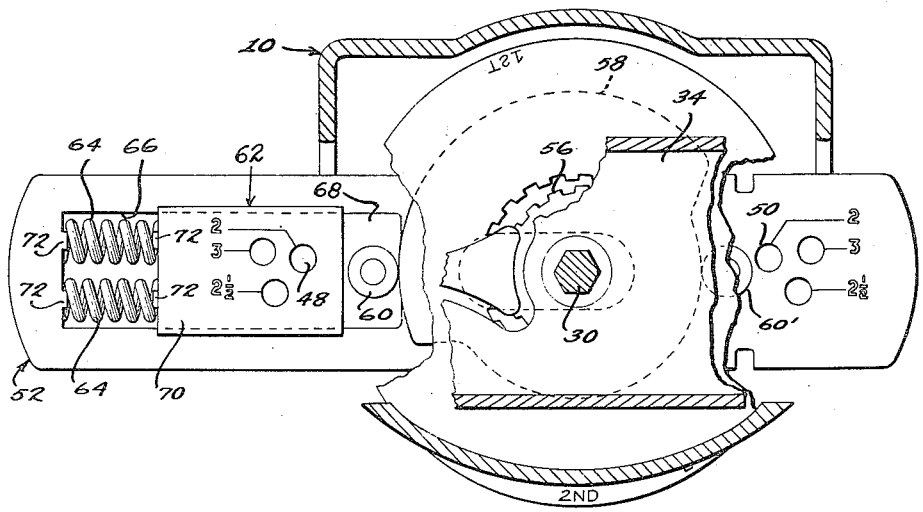
Fig. 5 is a horizontal section corresponding generally to Fig. 4, but partly cut away and showing the cam which actuates the seaming rolls rotated 180° from the position shown in Fig. 4.

The driving chuck 22 is carried on a drive shaft 30 which is journaled in the head portion of the frame structure 10 in the bore of a boss 32, and in a support plate 34 assembled on the head portion of frame structure 10 by bolts 36 (see Fig. 3). The driving chuck 22, an eccentric member 38, a circular bushing 40, and a bevel gear 42 are all fitted on this drive shaft 30 for rotation with it. The drive shaft 30 is actuated from the hand crank 18 through a crankshaft 44 which is also journaled in the head portion of the frame structure 10 and which carries a bevel gear 46 disposed to engage the bevel gear 42 on drive shaft 30, so that rotation of the hand crank 18 will result in rotation of the driving chuck 22 and consequent rotation of a can body 12 and associated lid 14 held between the supporting table 20 and drive chuck 22.

As previously mentioned, seaming rolls, which usually consist of a primary or first operation seaming roll 48 and a secondary or second operation seaming roll 50, are arranged on a reciprocating crosshead, indicated generally in the drawing by the numeral 52, for application successively to a can body 12 and lid 14 held and rotated by the chuck means for seaming. The crosshead 52 is supported in downwardly extending ears formed in each end of the support plate 34 for reciprocation transversely of the can body 12 and lid 14 held by the chuck means. Reciprocation of the crosshead 52 is actuated from the drive shaft 30 through the previously noted eccentric member 38 which transmits rotation of the drive shaft 30, by means of a nested external-internal gear mechanism 56, to a cam member 58 disposed in relation to opposed cam followers 60 and 60' mounted on the crosshead 52. All of the foregoing elements of the can seaming mechanism shown in the drawing are described at length in our above noted copending application, and reference is made to that application for further details of the arrangement and operation of these elements.

The present invention provides means, as previously noted, for mounting the seaming rolls 48 and 50, and the related cam followers 60 and 60' through which the force of application of the seaming rolls is exerted on the reciprocating crosshead 52 so that a force of application for the seaming rolls 48 and 50 may be transmitted from the crosshead 52 at a predetermined desired level during the seaming operation. Generally described, this result is accomplished by incorporating yieldable means in the operating mechanism by which the seaming rolls 48 and 50 are applied, with the yieldable means arranged with a disposition interposing it for transmitting the force of application to the seaming rolls 48 and 50. For this purpose, according to the embodiment of the invention illustrated in Figs. 1 to 7 of the drawing, a slide member 62 is assembled with the crosshead 52 adjacent one end for mounting one of the seaming rolls 48 and one of the cam followers 60; the other seaming roll 50, and the other cam follower 60', being mounted directly on the crosshead 52 adjacent its opposite end. It should be noted that it is the cam follower 60 that causes application of the seaming roll 50, and that the cam follower 60' causes application of the seaming roll 48. The yieldable means mentioned above is arranged on the crosshead 52 as shown at 64 to position the slide member 62, and is thereby interposed for transmitting the force of application to the seaming rolls 48 and 50 as will appear more in detail presently.

To provide for assembly of the slide member 62 and yieldable means 64, the crosshead 52 is formed with a generally rectangular opening as indicated in the drawing at 66. The slide member 62 comprises a main body portion 68 (compare Figs. 2, 6 and 7) proportioned in width to fit this rectangular opening 66, and assembly plates 70, having a width proportioned to overlap the side edges of the opening 66 so as to ride the top and bottom faces of the crosshead 52 and thus secure the body portion 68 for sliding movement in the opening 66 when assembled therewith as by projection welding or the like.

The yieldable means 64 may take any suitable form adapted for exerting a yielding and sufficiently constant pressure. Conventional compression springs, as illustrated in the drawing, will usually be found to be the most convenient and practicable form, but an equivalent function could be obtained through the use of other means, such as hydraulic means, and such other means might be used according to the present invention if desired. The springs 64 shown in the drawing are disposed on the crosshead 52 to press the slide member 62 yieldingly inward on the crosshead 52, and the outer edge of the opening 66 and the rear edge of the body portion 68 are preferably formed with lugs 72 for positioning the springs 64 and retaining them in place.

With the crosshead 52 arranged in this manner, it will be noted that as it is reciprocated, by means of the cam member 58 through the cam followers 60 and 60' upon rotation of the drive shaft 30, for application of the seaming rolls 48 and 50, the force of the application exerted on the seaming rolls 48 and 50 will in each case be transmitted through the springs 64 by virtue of the mounting of one of the seaming rolls 48 on the slide member 62 in one instance, and the mounting of the cam follower 60' provided for applying the other seaming roll 50 on the slide member 62 in the other instance. Accordingly, with this arrangement of the crosshead 52, each of the seaming rolls 48 and 50 is disposed for automatically finding a properly loaded position during the seaming operation, without any necessity for adjusting them precisely with some gauge means beforehand.

In order to position the seaming rolls 48 and 50 in this manner so that they will have an adequate force of application during the seaming operation, the spring means 64 should be preloaded when assembled on the crosshead 52 to position the slide member 62. By selecting springs 64 with a proper spring rate and setting the preloading at a proper level, the force of application of seaming rolls 48 and 50 can be maintained within a satisfactory predetermined range while at the same time providing automatic compensation for the usual variations in tolerances of the operating elements of the can sealing mechanism, and for wear of these elements during operation. A further important advantage of the yieldable means 64 incorporated in the operating mechanism of the can seamer of the present invention is that the force of application on the seaming rolls 48 and 50 is always yieldingly transmitted in a manner such that at the usual vertical seam in the can body 12 where a double wall thickness is encountered, the seaming rolls 48 and 50 will give so as to ride over the vertical seam smoothly without stalling or stopping actuation of the seaming operation. This feature is particularly important where the can seaming mechanism is one adapted for hand actuation which can be rendered objectionably difficult if provision is not made for riding over the vertical seam in the can bodies.

The selection and arrangement of the springs 64 may be further illustrated by an actual example. For working with the types and sizes of cans commonly used in canning operations, a force of application on the seaming rolls 48 and 50 of about 200 to 400 pounds is required for satisfactory results, and the useful range of spring rates for applying such a force is of the order of 1200 pounds/inch to 2200 pounds/inch. A spring rate above this range is not desirable because differences due to wear and variations in tolerance make a greater difference in loading, while a spring rate below this range has the disadvantage of not building up pressure fast enough so that it imposes undue space requirements. The ultimate comparison is between the spring characteristics of the rigid operating elements of the can sealing mechanism which may be considered as having an infinitely high spring rate, and the spring characteristics of an infinitely long spring which would have a constant spring rate, i. e., would exert a constant pressure. As a practical matter, the constant pressure characteristics of an infinite spring have to be sacrificed to some extent in order to obtain a spring suited for reasonable design requirements, while the sacrifice made should be limited as much as possible to avoid the disadvantages inherent in the assemblies of rigid operating elements characteristic of the can sealing mechanism heretofore in use. The selection of a particular spring rate in a given instance will accordingly depend on the balance desired between these two considerations, and in the usual case the useful range of spring rates will be found to be as stated above.

In an actual instance of construction of a can sealing mechanism according to the present invention, an aggregate spring rate of 1600 pounds/inch was employed through the use of two springs 64 each having an individual spring rate of 800 pounds/inch. These springs were provided in a free length of one inch, and were compressed for assembly to a length of .840 inch, thus providing a total preload of about 250 pounds. The crosshead 52 was otherwise arranged so that the slide member 62 backed off about .030 inch during application of the primary seaming roll 48, and about .060 inch during application of the secondary seaming roll 50, i. e., the seaming rolls 48 and 50 were disposed on the crosshead 52, and normally positioned by the action of the springs 64 on the slide member 62, for overriding when applied to the lid 14 and can body 12. Accordingly, the springs 64 were disposed to exert a total loading of about 300 pounds during the first seaming operation, and about 350 pounds during the second or finishing operation. Now suppose, on the basis of the actual figures noted above, that compensation was required for a variation in tolerances of .030 inch, which would be an excessive figure if the can sealing mechanism were carefully manufactured, or suppose that a variation of this order had been introduced by wear on the operating elements, with a total spring rate of 1600 pounds/inch, this variation would only cause a change in loading of less than 50 pounds which at the maximum would be within the allowable range for satisfactory results, and which maximum would not likely be even approached except in the rarest of cases.

This same general arrangement of the present invention for transmitting the force of application to the seaming rolls 48 and 50 through yieldable means as described above and illustrated in Figs. 1 to 7 of the drawing, can be obtained in other ways as illustrated further in Figs. 8 and 9 of the drawing. Generally stated the arrangement is obtained whenever the yieldable means is interposed to transmit the force of application to the seaming rolls, and with reference to the embodiment shown in Figs. 1 to 7 of the drawing, the same arrangement would result as long as at least one element of each paired seaming roll and opposed cam follower (48 and 60', or 50 and 60) were arranged for loading by the yieldable means.

This is illustrated in Fig. 8 in which separate slide members 62' are arranged on the crosshead 52' for mounting each of the seaming rolls 48 and 50, and loaded by separate yieldable means 64', while the opposed cam followers 60 and 60' are both mounted directly on the crosshead 52'. A further variation is illustrated in Fig. 9 in which the opposed cam followers 60 and 60' are mounted on slide members 62" which are arranged on the crosshead 52" for loading by yieldable means 64", and the seaming rolls 48 and 50 are mounted directly on the crosshead 52".

The important practical result of this arrangement is that it allows a can seaming mechanism to be manufactured and supplied fully set and ready for use, and built so that no adjustment whatever is necessary by the user either initially or subsequently during continued use.

We claim:

1. In a can seaming mechanism of the type incorporating seaming rolls for seaming a lid on a can body, and an operating mechanism for applying the seaming rolls to the lid and can body, the improvement which comprises yieldable means incorporated in said operating mechanism for transmitting the force of application to said seaming rolls, and mounting means disposing said seaming rolls in a normal position in relation to said operating mechanism such that when the seaming rolls are applied to said lid and can body they are caused to back off from their normal position and against said yieldable means a distance at least as great as the maximum variation normally to be expected in the relative disposition of said seaming rolls due to differences in manufacturing tolerances and wear and the like, whereby the force of application on said seaming rolls is determined solely by said yieldable means, and said yieldable means being preloaded by initial compression against said seaming rolls for obtaining a force of application on said seaming rolls at a predetermined desired level during the seaming operation, and having a spring rate such that compensation for variations in manufacturing tolerances and for wear and the like is provided automatically while still maintaining the force of application on said seaming rolls within effective limits in relation to said predetermined level.

2. In a can seaming mechanism of the type incorporating primary and secondary seaming rolls for seaming a lid on a can body and means for supporting and rotating a can body and associated lid while applying the seaming rolls, the combination with a crosshead disposed for reciprocation transversely of the can body and arranged for carrying the seaming rolls together with opposed cam followers through which the crosshead is reciprocated to apply said seaming rolls successively during rotation of said can body, of a slide member assembled with said crosshead for mounting one of said seaming rolls and the cam follower carried by said crosshead for applying the other seaming roll, and spring means disposed on said crosshead and preloaded by initial compression between said crosshead and slide member for yieldably positioning said slide member normally so that said seaming rolls are disposed for tending to override when applied to said lid and can body for a distance at least as great as the maximum variation normally to be expected in the relative disposition of said seaming rolls due to differences in manufacturing tolerances and wear and the like, whereby said slide member must back off from its normal position upon application of said seaming rolls and the force of application on said seaming rolls is thereby determined solely by said spring means, and said spring means being preloaded for transmitting the force of application through said slide member to said seaming rolls at a predetermined desired level during the seaming operation, and having a spring rate such that automatic compensation is provided for normal dimensional variations in the operating elements of the can seaming mechanism or in the lid and can body being sealed and for wear and the like without varying the force of application of the seaming rolls beyond a satisfactory operating range.

3. In a can seaming mechanism of the type incorporating primary and secondary seaming rolls for seaming a lid on a can body and means for supporting and rotating a can body and associated lid while applying the seaming rolls, the combination defined in claim 2 and further characterized in that said crosshead and said slide member are each formed for providing a plurality of mounting positions for said seaming rolls corresponding to a plurality of can sizes, whereby said seaming rolls may be selectively positioned for a variety of can sizes.

4. In a can seaming mechanism of the type incorporating primary and secondary seaming rolls for seaming a lid on a can body and means for supporting and rotating a can body and associated lid while applying the seaming rolls, the combination with a crosshead disposed for reciprocation transversely of the can body and arranged for carrying the seaming rolls together with opposed cam followers through which the crosshead is reciprocated to apply said seaming rolls successively during rotation of said can body, of at least one slide member assembled with said crosshead for mounting at least one element of each paired seaming roll and opposed cam follower, and spring means disposed on said crosshead and preloaded by initial compression between said crosshead and slide member for yieldably positioning said slide member normally so that said seaming rolls are disposed for tending to override when applied to said lid and can body for a distance at least as great as the maximum variation normally to be expected in the relative disposition of said seaming rolls due to differences in manufacturing tolerances and wear and the like, whereby said slide member must back off from its normal position upon application of said seaming rolls and the force of application on said seaming rolls is thereby determined solely by said spring means, and said spring means being preloaded for transmitting the force of application through said slide member to said seaming rolls at a predetermined desired level during the seaming operation, and having a spring rate such that automatic compensation is provided for normal dimensional variations in the operating elements of the can seaming mechanism or in the lid and can body being sealed and for wear and the like without varying the force of application of the seaming rolls beyond a satisfactory operating range.

5. In a can seaming mechanism, the combination with seaming rolls for seaming a lid on a can body, and an operating mechanism adapted for carrying said seaming rolls and through which the force of application is exerted for applying said seaming rolls to the lid and can body, of yieldable means incorporated in said operating mechanism and preloaded by initial compression against said seaming rolls for transmitting the force of application to said seaming rolls at a predetermined desired level during the seaming operation, said seaming rolls being carried by said operating mechanism in a normal position such that when they are applied to said lid and can body they are caused to back off from their normal position and against said yieldable means a distance at least as great as the maximum variation normally to be expected in the relative disposition of said seaming rolls due to differences in manufacturing tolerances and wear and the like, whereby the force of application on said seaming rolls is determined solely by said yieldable means, and said yieldable means having a spring rate such that compensation for variations in manufacturing tolerances and for wear and the like is provided automatically without varying the force of application on said seaming rolls beyond a satisfactory operating range.

6. In a can seaming mechanism of the type incorporating seaming rolls for seaming a lid on a can body, and an operating mechanism adapted for carrying said seaming rolls and through which the force of application is exerted for applying said seaming rolls to the lid and can body, the improvement which comprises springs incorporated in said operating mechanism and interposed for transmitting the force of application to said seaming rolls, said seaming rolls being carried by said operating mechanism in a normal position such that when they are applied to said lid and can body they are caused to back off from their normal position and against said springs a distance at least as great as the maximum variation normally to be expected in the relative disposition of said seaming rolls due to differences in manufacturing tolerances and wear and the like, whereby the force of application on said seaming rolls is determined solely by said yieldable means, said springs being preloaded by initial compression against said seaming rolls for obtaining a force of application on said seaming rolls at a predetermined desired level during the seaming operation, and said springs having a rate such that automatic compensation is provided for normal dimensional variations in the operating elements of the can seaming mechanism or in the lid and can body being sealed and for wear and the like without varying the force of application of the seaming rolls beyond a satisfactory operating range.

7. In a can seaming mechanism of the type particularly adapted for home canning operations in which a lid is sealed on a can body by seaming, an improved means for applying seaming rolls to the lid and can body comprising an operating mechanism adapted for carrying the seaming rolls and arranged for actuation by hand for exerting the necessary force of application on the seaming rolls, and yieldable means incorporated in said operating mechanism and interposed for transmitting said force of application, said seaming rolls being carried by said operating mechanism in a normal position such that when they are applied to said lid and can body they are caused to back off from their normal position and against said yieldable means a distance at least as great as the maximum variation normally to be expected in the relative disposition of said seaming rolls due to differences in manufacturing tolerances and wear and the like, whereby the force of application on said seaming rolls is determined solely by said yieldable means, and said yieldable means being preloaded by initial compression against said seaming rolls for obtaining a force of application on the seaming rolls at a predetermined desired level during the seaming operation, and having a spring rate such that compensation for variations in manufacturing tolerances and for wear and the like is provided automatically while still maintaining the force of application on said seaming rolls within effective limits in relation to said predetermined level.

8. In a can seaming mechanism of the type particularly adapted for home canning operations in which a lid is sealed on a can body by seaming, an improved means for applying seaming rolls to the lid and can body comprising a crosshead arranged for supporting the seaming rolls and disposed for reciprocation transversely of the can body, hand actuated means for reciprocating said crosshead to exert the necessary force of application on the seaming rolls successively for seaming the lid on the can body, and springs mounted on said crosshead and preloaded by initial compression against said seaming rolls with a disposition interposing them for transmitting said force of application at a predetermined desired level during the seaming operation, said seaming rolls being supported by said crosshead in a normal position such that when they are applied to said lid and can body they are caused to back off from their normal position and against said springs a distance at least as great as the maximum variation normally to be expected in the relative disposition of said seaming rolls due to differences in manufacturing tolerances and wear and the like, whereby the force of application on said seaming rolls is determined solely by said preloaded springs, and said springs having a rate such that automatic compensation is provided for normal dimensional variations in the operating elements of the can seaming mechanism or in the lid and can body being sealed and for wear and the like without varying the force of application on the seaming rolls beyond a satisfactory operating range.

9. In a can seaming mechanism of the type incorporating primary and secondary seaming rolls for seaming a lid on a can body, and an operating mechanism for applying the seaming rolls to the lid and can body, the combination with rotatable chuck means for supporting a can body and an associated lid for seaming, means for rotating said chuck means including a drive shaft, a crosshead arranged for supporting the seaming rolls and disposed for reciprocation transversely of the can body, and cam means actuated by said drive shaft for reciprocating said crosshead to apply the seaming rolls successively for seaming the lid on the can body, of springs assembled on said crosshead with an initial compression preloading them against said seaming rolls and with a disposition interposing them for transmitting the force of application from said crosshead to said seaming rolls at a predetermined desired level during the seaming operation, and mounting means disposing said seaming rolls in a normal position such that when they are applied to said lid and can body they are caused to back off from their normal position and against said springs a distance at least as great as the maximum variation normally to be expected in the relative disposition of said seaming rolls due to differences in manufacturing tolerances and wear and the like, whereby the force of application on said seaming rolls is determined solely by said preloaded springs, and said springs having a rate such that automatic compensation is provided for normal dimensional variations in the operating elements of the can seaming mechanism or in the lid and can body being sealed and for wear and the like without varying the force of application of the seaming rolls beyond a satisfactory operating range.

OLIVER R. ROWE.
CHARLES S. W. KING.
WILLIAM J. STOLP.

REFERENCES CITED

The following references are of record in the file of this patent:

UNITED STATES PATENTS

| Number | Name | Date |
|---|---|---|
| 521,751 | Abbott | June 19, 1894 |
| 871,855 | Beyer | Nov. 26, 1907 |
| 871,856 | Beyer | Nov. 26, 1907 |
| 871,857 | Beyer | Nov. 26, 1907 |
| 871,480 | Beyer | Jan. 28, 1908 |
| 1,351,831 | Brenzinger | Sept. 7, 1920 |
| 2,391,684 | Diezel | Dec. 25, 1945 |

FOREIGN PATENTS

| Number | Country | Date |
|---|---|---|
| 402,621 | Germany | Sept. 22, 1924 |
| 263,682 | Italy | Mar. 27, 1929 |